United States Patent
Nishiguchi et al.

(10) Patent No.: US 12,442,075 B2
(45) Date of Patent: Oct. 14, 2025

(54) OZONE GAS SUPPLY SYSTEM

(71) Applicant: MEIDEN NANOPROCESS INNOVATIONS, INC., Tokyo (JP)

(72) Inventors: Tetsuya Nishiguchi, Tokyo (JP); Yoshiki Morikawa, Shizuoka (JP); Hiroaki Yamashita, Chiba (JP)

(73) Assignee: MEIDEN NANOPROCESS INNOVATIONS, INC., Tokyo (JP)

( * ) Notice: Subject to any disclaimer, the term of this patent is extended or adjusted under 35 U.S.C. 154(b) by 0 days.

(21) Appl. No.: 18/881,710

(22) PCT Filed: Jun. 13, 2023

(86) PCT No.: PCT/JP2023/021827
§ 371 (c)(1),
(2) Date: Jan. 6, 2025

(87) PCT Pub. No.: WO2024/009699
PCT Pub. Date: Jan. 11, 2024

(65) Prior Publication Data
US 2025/0257456 A1 Aug. 14, 2025

(30) Foreign Application Priority Data
Jul. 8, 2022 (JP) .................. 2022-110562

(51) Int. Cl.
C23C 16/455 (2006.01)
C23C 16/52 (2006.01)

(52) U.S. Cl.
CPC ........ C23C 16/45534 (2013.01); C23C 16/52 (2013.01)

(58) Field of Classification Search
CPC ........ C23C 16/45525; C23C 16/45527; C23C 16/45534; H01L 21/67017; Y10T 137/2499
See application file for complete search history.

(56) References Cited

U.S. PATENT DOCUMENTS 5,904,170 A * 5/1999 Harvey .................. G05D 11/08
422/186.14
7,244,335 B2 * 7/2007 Chono .............. H01L 21/67017
156/345.32

(Continued)

FOREIGN PATENT DOCUMENTS

JP 2002-249304 A 9/2002
JP 2009-018969 A 1/2009

(Continued)

OTHER PUBLICATIONS

Chris Le Tiec, MKS Instruments, Plasma and Reactive Gas Solutions, "Ozone Applications for Atomic Layer Processing," mksinst.com, 2020, 12 pages.

*Primary Examiner* — Kevin F Murphy
(74) *Attorney, Agent, or Firm* — Foley & Lardner LLP

(57) ABSTRACT

An ozone gas supply system includes a buffer tank for temporarily storing a high-concentration ozone gas supplied from an ozone vessel of an ozone gas supply unit, and for supplying the high-concentration ozone gas to an ozone gas utilization system. A control section detects a decrease in the ozone concentration in the buffer tank, based on a value of pressure of the ozone vessel at a predetermined temperature, with reference to a relationship between temperature and pressure of an ozone gas having an ozone concentration of 100% and a relationship between temperature and pressure of an ozone gas having an ozone concentration of less than 100%. In response to detection of a decrease in the ozone concentration in the buffer tank, gas within the buffer tank is exhausted out of the system, and the high-concentration ozone gas is thereafter supplied from the ozone vessel to the buffer tank.

12 Claims, 5 Drawing Sheets

(56) References Cited

U.S. PATENT DOCUMENTS

| | | | |
|---|---|---|---|
| 11,220,750 B2* | 1/2022 | Noyori | ............ C23C 16/45591 |
| 2010/0043888 A1 | 2/2010 | Sneh | |
| 2011/0052483 A1 | 3/2011 | Tabata et al. | |
| 2020/0384142 A1 | 12/2020 | Medvedev et al. | |

FOREIGN PATENT DOCUMENTS

| | | | |
|---|---|---|---|
| JP | 2010-222168 A | 10/2010 |
| JP | 2010-223478 A | 10/2010 |
| JP | 2014-189407 A | 10/2014 |
| WO | WO-2009/069774 A1 | 6/2009 |

* cited by examiner

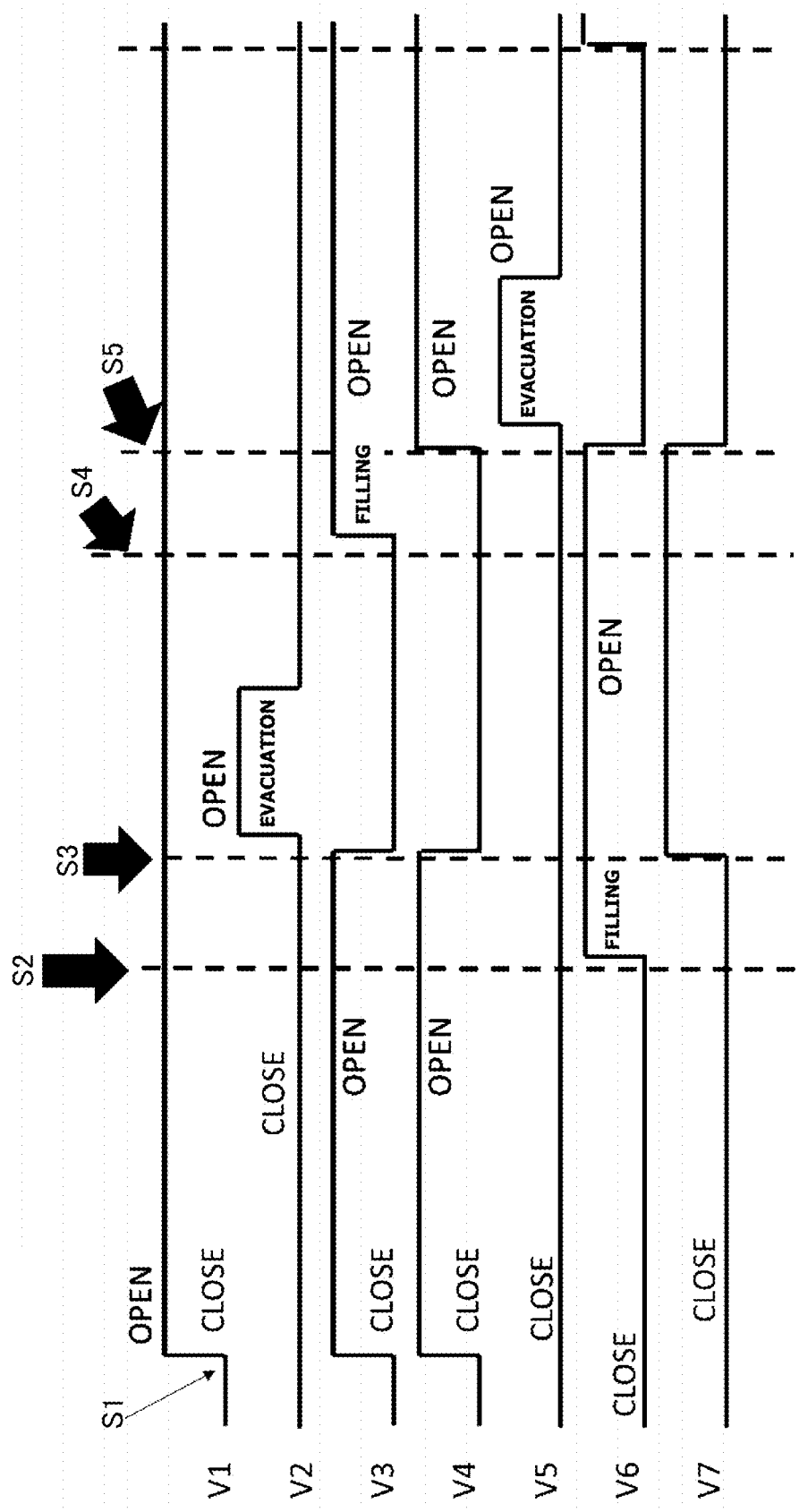

OZONE GAS SUPPLY SYSTEM

TECHNICAL FIELD

The present invention relates to an ozone gas supply system for an ozone utilization process such as ALD (Atomic Layer Deposition).

BACKGROUND ART

Deposition of an oxide film using ALD is advantageous in enhancing adhesion of the oxide film to a surface of a substrate having a complex 3D shape, and reducing a temperature for film formation. For this reason, in recent years, application of this technique is expanded to environmental resistant surface coating films for electronics such as semiconductor memories and logic devices, and electric power generation and storage devices (solar, fuel cells, etc.), and optical anti-reflection (AR) films for light-emitting devices such as LEDs. In particular, metal oxide films ($Al_2O_3$, $TiO_2$, $HfO_2$, etc.) and semiconductor oxide films ($SiO_2$) are widely used in those various fields.

For oxidizing an ALD material gas at a low temperature to produce a high-quality oxide film, an active radical, which can be generated by various methods using plasma, is used as an oxidizing agent, and ozone gas is also widely used which can reduce damage to the film, improve the quality of the film, and realize low-temperature film formation (see non-patent document 1).

Prior Art Document(s)

Non-Patent Document(s)
  Non-Patent Document 1: Chris Le Tiec, Fellow and CTO, MKS Instruments, Plasma and Reactive Gas Solutions, "Ozone Applications for Atomic Layer Processing" OzoneALD-TechPap.pdf (mksinst.com), 2020.
Patent Document(s)
  Patent Document 1: US Patent US2010/0043888

SUMMARY OF INVENTION

In a typical ALD process, a time period during which an oxidant (ozone gas, plasma discharge) is used or a time period during which gas is introduced into a processing device is about 10% of a total process time. The gas is not used for the ALD process most of the time (90%). However, in order to stabilize the concentration of generated ozone, it is required to constantly produce ozone gas at a constant flow rate and feed the produced ozone gas into an auxiliary device such as an exhaust pump or ozone abatement device (a system for decomposing ozone gas into oxygen gas), when the ozone gas is not used by an ALD device. This causes a problem of heavy loads on the exhaust pump and the ozone abatement device (see patent document 1).

The concentration of ozone gas generated by an ozone generator varies depending on the flow rate of a raw material gas (oxygen gas) and the temperature of a cell. Furthermore, near the atmospheric pressure, ozone gas in the ozone generator has a short life span and easily decomposes into oxygen gas, so that it is required to eliminate dead spaces (spaces where gas flow stagnates). Furthermore, it is required to install an in-line ozone concentration meter, and perform a feedback control to keep the temperature of piping below a room temperature (25° C.) and absorb fluctuations. In this way, various efforts are currently being made to improve device configuration in order to achieve reproducibility between pulses in the ALD process and reproduce the film quality.

Furthermore, if $N_2$-free high-purity oxygen gas is used as a raw material gas to produce ozone, NOx-free ozone gas can be produced. In an ALD process, where particle generation causes a problem in terms of performance of semiconductor devices, it is required to use high-purity (99.99%, 4N or higher) oxygen gas. However, this increases a cost of the gas.

In order to reduce a running cost of an ALD device, it is required to improve the efficiency of ozone gas generation in an ozone discharge tube and produce only the amount of ozone gas that is to be used.

However, since the efficiency of ozone gas generation remains at around 20%, and since discharging for ozone gas is unstable once it is stopped, it is required to continue discharging under constant conditions (discharge power, gas pressure, gas flow rate) regardless of the time zone of day when the ozone gas is used.

In view of the foregoing, it is an object of the present invention to improve the utilization efficiency of ozone gas supplied to an ozone-utilizing process, thereby reducing the running cost and environmental load of the ozone-utilizing process.

According to one aspect of the present invention, an ozone gas supply system includes: a buffer tank structured to temporarily store a high-concentration ozone gas having an ozone concentration of 80% or more, and supply the high-concentration ozone gas to an ozone gas utilization system, wherein the high-concentration ozone gas is supplied to the buffer tank from an ozone vessel of an ozone gas supply unit; and a control section configured to detect a decrease in the ozone concentration in the buffer tank, based on a value of pressure of the ozone vessel at a predetermined temperature of the ozone vessel, with reference to a relationship between temperature and pressure of an ozone gas having an ozone concentration of 100% and a relationship between temperature and pressure of an ozone gas having an ozone concentration of less than 100%, wherein the ozone vessel is communicating with the buffer tank; wherein, in response to detection of a decrease in the ozone concentration in the buffer tank, gas within the buffer tank and gas supply piping is exhausted out of the ozone gas supply system, and after the exhausting, the high-concentration ozone gas is supplied from the ozone vessel to the buffer tank, wherein the gas supply piping connects the buffer tank and the ozone vessel.

According to one aspect of the present invention, the ozone gas supply system further includes: a supply valve structured to supply the high-concentration ozone gas from the ozone vessel to the buffer tank; and an exhaust valve structured to exhaust the gas within the buffer tank and the gas supply piping out of the ozone gas supply system; wherein the control section is configured to control operation of the supply valve and the exhaust valve based on an estimated value of the ozone concentration in the buffer tank, wherein the estimated value is calculated based on the value of pressure of the ozone vessel at the predetermined temperature of the ozone vessel.

According to one aspect of the present invention, the ozone gas supply system is configured wherein the control section is configured to close the supply valve and open the exhaust valve, in response to detection of a decrease in the ozone concentration in the buffer tank.

According to one aspect of the present invention, the ozone gas supply system is configured wherein the control section is configured to output a signal to the ozone gas utilization system, in response to detection of a decrease in the ozone concentration in the buffer tank, wherein the signal is indicative of disabling ozone supply.

According to one aspect of the present invention, the ozone gas supply system includes two of the buffer tanks arranged in parallel, wherein, in response to detection of a decrease in the ozone concentration in a first one of the buffer tanks while the high-concentration ozone gas is supplied via the first buffer tank, supply of the high-concentration ozone gas is switched to supply via a second one of the buffer tanks.

According to one aspect of the present invention, the ozone gas supply system further includes: a supply valve structured to supply the high-concentration ozone gas from the ozone vessel to the first buffer tank or the second buffer tank; a first exhaust valve structured to exhaust the gas within the first buffer tank out of the ozone gas supply system; a first switching valve set structured to supply the high-concentration ozone gas to the ozone gas utilization system via the first buffer tank; a second exhaust valve structured to exhaust the gas within the second buffer tank out of the ozone gas supply system; and a second switching valve set structured to supply the high-concentration ozone gas to the ozone gas utilization system via the second buffer tank; wherein the control section is configured to control operation of the supply valve, the first exhaust valve, the first switching valve set, the second exhaust valve, and the second switching valve set, based on an estimated value of the ozone concentration in the first buffer tank and an estimated value of the ozone concentration in the second buffer tank, wherein the estimated values are calculated based on the value of pressure of the ozone vessel at the predetermined temperature of the ozone vessel.

According to one aspect of the present invention, the ozone gas supply system is configured wherein the control section is configured to, in response to detection of a decrease in the ozone concentration in the first buffer tank, supply the high-concentration ozone gas to the second buffer tank by closing a second switching valve of the second switching valve set downstream of the second buffer tank, and opening a second switching valve of the second switching valve set upstream of the second buffer tank.

According to one aspect of the present invention, the ozone gas supply system is configured wherein the control section is configured to, in response to completion of filling of the second buffer tank with the high-concentration ozone gas, open the second switching valve of the second switching valve set downstream of the second buffer tank, close a first switching valve of the first switching valve set upstream of the first buffer tank, close a first switching valve of the first switching valve set downstream of the first buffer tank, and open the first exhaust valve.

According to one aspect of the present invention, the ozone gas supply system is configured wherein each of the first switching valve of the first switching valve set upstream of the first buffer tank and the second switching valve of the second switching valve set upstream of the second buffer tank is structured to be opened to have an opening that is adjustable stepwise.

According to one aspect of the present invention, the ozone gas supply system further includes an exhaust pump structured to cooperate with the first exhaust valve and the second exhaust valve to exhaust the gas within the first buffer tank and the second buffer tank out of the ozone gas supply system, wherein the control section is configured to control operation of the first exhaust valve and the second exhaust valve based on pressure of the exhaust pump.

According to the present invention described above, it is possible to allow ozone gas to be efficiently utilized for an ozone-utilizing process, and thereby present an ozone-utilizing process with a reduced running cost and a reduced environmental load.

BRIEF DESCRIPTION OF DRAWINGS

FIG. 5 shows a time schedule of valve operation according to the second embodiment.

MODE(S) FOR CARRYING OUT INVENTION

The following describes embodiments of the present invention with reference to the drawings.

Figure 1:
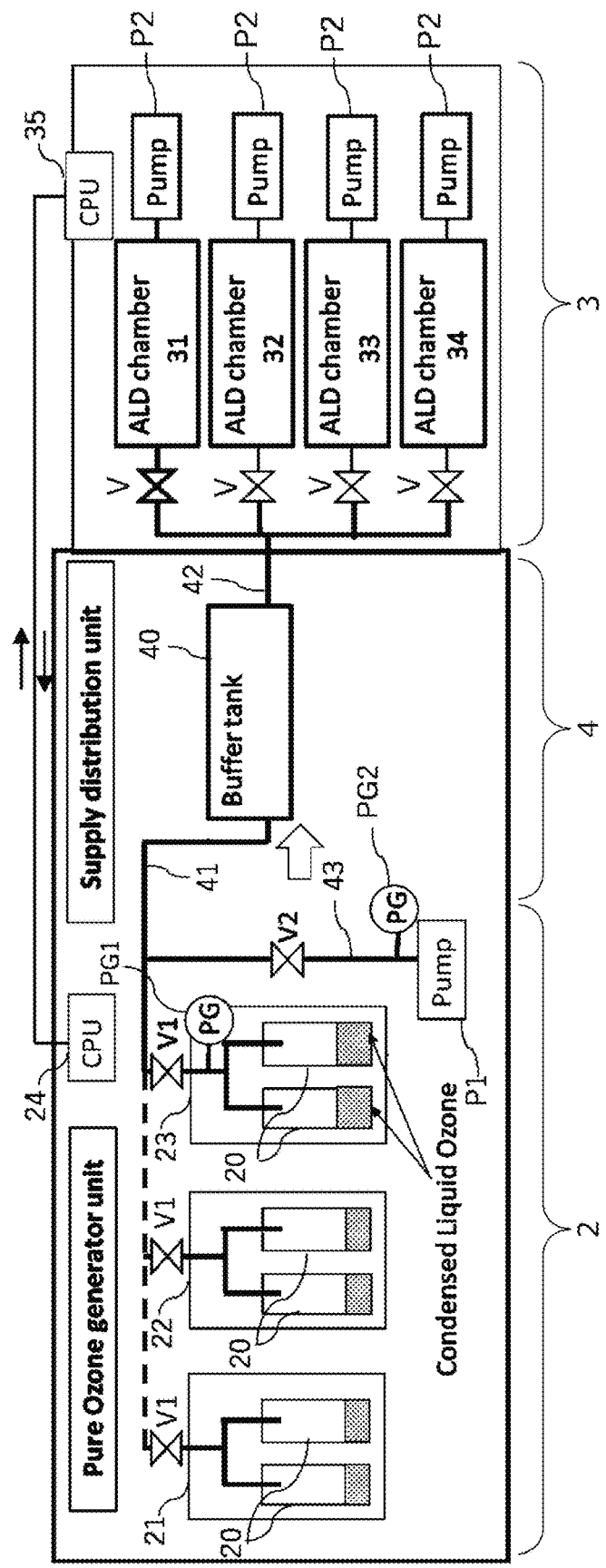
FIG. 1 is a schematic configuration diagram of an ozone gas supply system according to a first embodiment of the present invention.

[First Embodiment] FIG. 1 shows an ozone gas supply system 1 according to a first embodiment of the present invention, which supplies a high-concentration ozone gas to an ozone gas utilization system 3, wherein the high-concentration ozone gas has an ozone concentration of 80% or more. For example, the high-concentration ozone gas is produced by concentrating a low-concentration ozone gas by low-temperature fractional distillation or low-temperature adsorption, wherein the low-concentration ozone gas is produced by silent discharge or the like.

The ozone gas supply system 1 includes an ozone gas supply unit (pure ozone generator unit) 2, an ozone gas utilization system 3 for an ALD process, and an ozone gas supply distribution unit (supply distribution unit) 4 disposed between the ozone gas supply unit 2 and the ozone gas utilization system 3.

<Ozone Gas Supply Unit 2> The ozone gas supply unit 2 includes ozone gas supply devices 21, 22, and 23.

The ozone gas supply devices 21, 22, and 23 each include a pair of ozone vessels 20 and a supply valve V1. The supply valve V1 supplies a concentrated ozone gas contained in the ozone vessels 20 to the ozone gas supply distribution unit 4.

The ozone vessel 20 stores the high-concentration ozone gas that is produced by low temperature fractional distillation or low temperature adsorption in this example. A temperature sensor T, such as a thermocouple or a resistance temperature detector, is provided within the ozone vessel 20.

The supply valve V1 is disposed in gas supply piping 41 that connects the ozone vessel 20 to a buffer tank 40 of the ozone gas supply distribution unit 4. Furthermore, a pressure gauge PG1 is disposed in a section of the gas supply piping 41 upstream of and close to the supply valve V1.

The gas supply piping 41 is connected to gas exhaust piping 43. The gas exhaust piping 43 is provided with an exhaust valve V2 and an exhaust pump P1 for exhausting gas within the buffer tank 40 and the gas supply piping 41 to an outside of the system. Furthermore, the gas exhaust piping 43 is provided with a pressure gauge PG2 disposed between the exhaust valve V2 and the exhaust pump P1.

Operation of the supply valve V1, the exhaust valve V2, and the exhaust pump P1 is controlled by a control section (CPU) 24 based on sensed values of the temperature sensor T and the pressure gauges PG1 and PG2. Thereby, the buffer tank 40 and the gas supply piping 41 are controlled to have a constant pressure (for example, 6000 Pa) as described below.

<Ozone Gas Utilization System 3> In this example, the ozone gas utilization system 3 includes ALD chambers 31, 32, 33, and 34 for ALD processes. Each ALD chamber 31, 32, 33, 34 has an upstream side connected to the buffer tank 40 of the ozone gas supply distribution unit 4 via gas supply piping 42. The gas supply piping 42 is provided with ALD valves V corresponding to the ALD chambers 31, 32, 33, and 34. Furthermore, each ALD chamber 31, 32, 33, 34 has a downstream side connected to an ALD pump P2. The ALD valves V and the ALD pumps P2 are controlled by a control section (CPU) 35.

In this example, the control section 35 transfers opening and closing patterns and opening and closing timings of the ALD valves V in advance, or transfers opening and closing information of the ALD valves V in real time, to the control section 24 of the ozone gas supply unit 2. Thereby, the pressure of ozone gas in the ozone gas supply unit 2, the temperature of the ozone vessel 20 which affects the pressure of ozone gas, and a remaining quantity of concentrated ozone gas are controlled to an arbitrary suitable state. On the other hand, the control section 24 outputs a signal indicating an operating state of the ozone gas supply devices 21, 22, 23, for example, the presence or absence of ozone gas at a predetermined pressure, to the control section 35 in real time for controlling operation of the ALD valves V in the ozone gas utilization system 3.

<Ozone Gas Supply Distribution Unit 4> The ozone gas supply distribution unit 4 includes the buffer tank 40 that temporarily stores a high-concentration ozone gas supplied from any of the ozone gas supply devices 21, 22, 23 of the ozone gas supply unit 2.

The buffer tank 40 has an internal volume set to 5 to 40 times, preferably 10 to 20 times, a total amount (cc) of ozone gas required to be used per unit time (1 minute) in the ALD chambers 31, 32, 33, and 34. For example, if the ALD chambers 31, 32, and 33 each use 20 cm$^3$ of ozone gas per minute and the ALD chamber 34 uses 40 cm$^3$ of ozone gas per minute, wherein 100 cm$^3$ of ozone gas in total is used per minute, it is desirable to set the internal volume of the buffer tank 40 to 1,000 cm$^3$ to 2,000 cm$^3$. This prevents the ozone gas concentration in the buffer tank 40 from getting low, and allows ozone gas to be replenished through the supply valves V1 at a sufficiently high speed in response to a gas demand from multiple ALD processes, against gas extraction from the multiple devices.

The high-concentration ozone gas in the buffer tank 40 is simultaneously distributed and supplied to the ALD chambers 31, 32, 33, and 34 via the ALD valves V in the ozone gas utilization system 3 which are opened at arbitrary timings and for arbitrary durations. This makes it possible to simultaneously supply each of the ALD chambers 31, 32, 33, and 34 with a stable amount of oxidant, and thereby form ALD films, with repeatability and reproducibility. The supply valves V1 are constantly opened when supplying ozone gas. When the ozone concentration in the buffer tank 40 falls below a predetermined set value (e.g., a concentration of 80%), the supply valves V1 are closed, the exhaust valve V2 is opened, and gas within the buffer tank 40 is evacuated by the exhaust pump P1. Then, when the pressure value of the pressure gauge PG2 upstream of the exhaust pump P1 falls below a predetermined pressure value (e.g., 50 Pa), the exhaust valve V2 is closed and the supply valves V1 are opened, and the buffer tank 40 is filled with the high-concentration ozone gas so that the pressure reaches the predetermined pressure value.

<Example of Operation> In the ozone gas supply distribution unit 4, the ozone concentration in the gas supply piping 41 and the buffer tank 40 decreases over time. For example, when the buffer tank 40 and its surrounding piping are made of stainless steel 316L, the piping has a temperature of 25° C., a charged pressure is 6,000 Pa, and the piping has a length of 20 m or less, ozone gas having an ozone concentration of 80% or more has a half-life having an order of 100 minutes.

The ALD chambers 31, 32, 33, and 34 are operated during a long continuous operation period, such as 24 hours (1,440 minutes) or one month (43,000 minutes) or more. Accordingly, in order to maintain the performance of the ALD processes over time, it requires an effective method for detecting a decrease in ozone concentration and an effective method for restoring the ozone concentration.

If the ozone concentration in the buffer tank 40 and the gas supply piping 41 decreases, the reproducibility of the ALD processes cannot be guaranteed. Accordingly, the ozone concentration is constantly monitored to ensure that it is within a certain range. When a decrease in the ozone concentration is detected, it is required to replace the gas in the gas supply piping 41 and the buffer tank 40. For example, ozone concentration may be monitored by the UV absorption spectrometry or the ultrasonic method. However, these methods not only inevitably result in decomposition of ozone, but also are expensive.

In view of the foregoing, the control section 35 of the ozone gas utilization system 3 stores in advance a table defining a relationship between the temperature and pressure in the ozone vessel 20 of the ozone gas supply unit 2. For example, in case of ozone gas produced by low-temperature fractional distillation, literature physical property values (characteristics of vapor pressure of a mixed gas of ozone and oxygen) are used to produce a curve showing a relationship between temperature and pressure at an ozone concentration of 100% and a curve showing a relationship between temperature and pressure at an ozone concentration of 99.9%, as shown in FIG. 2.

When the supply valves V1 are opened so that the buffer tank 40 is integrated with an ozone storage section including the ozone vessels 20 and the gas supply piping 41, a decrease in ozone concentration can be detected in a constant temperature control mode or in a constant pressure control mode described below.

Figure 2:
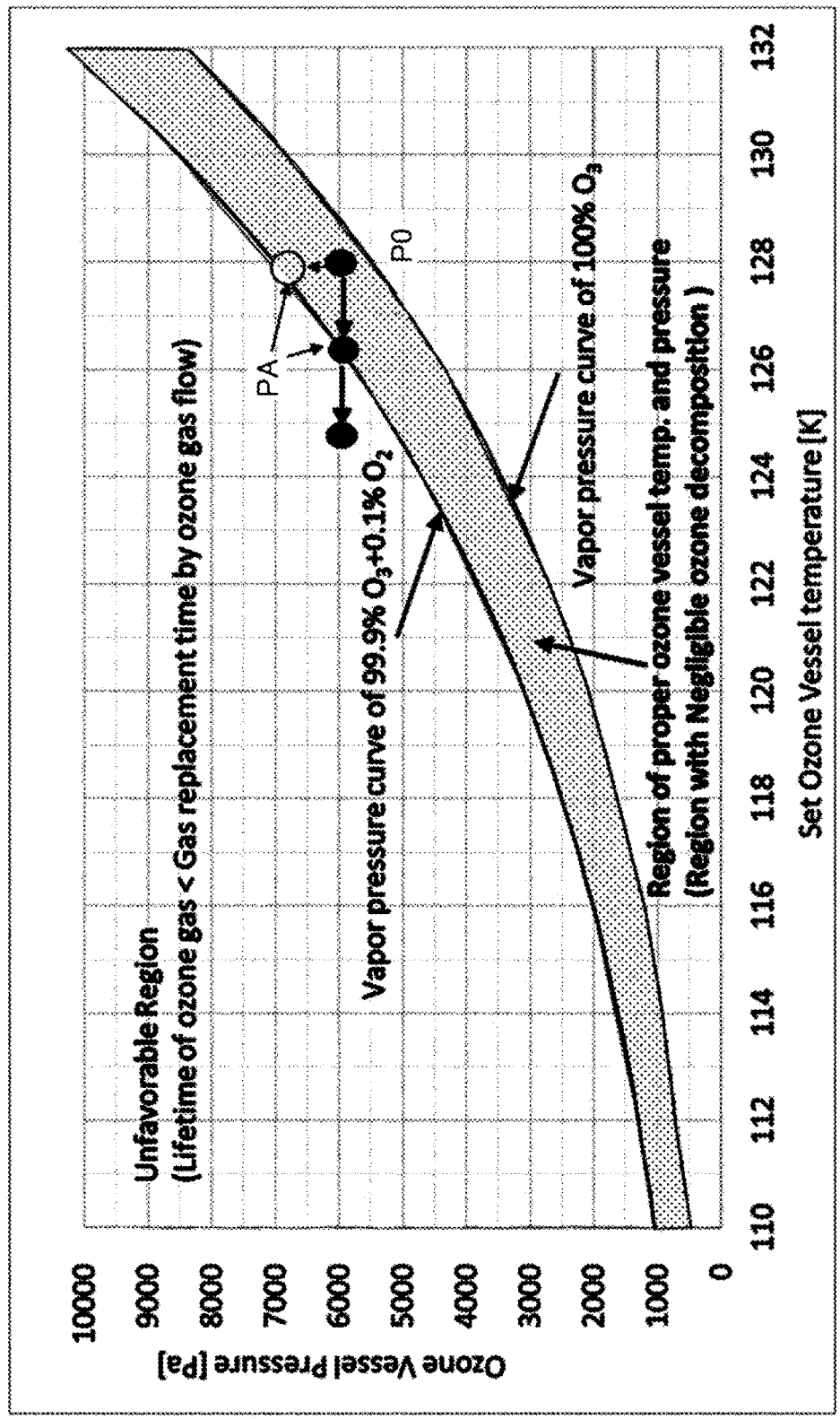
FIG. 2 shows operation phases of an ozone storage section according to the first embodiment in terms of operating temperature and pressure.
Figure 3:
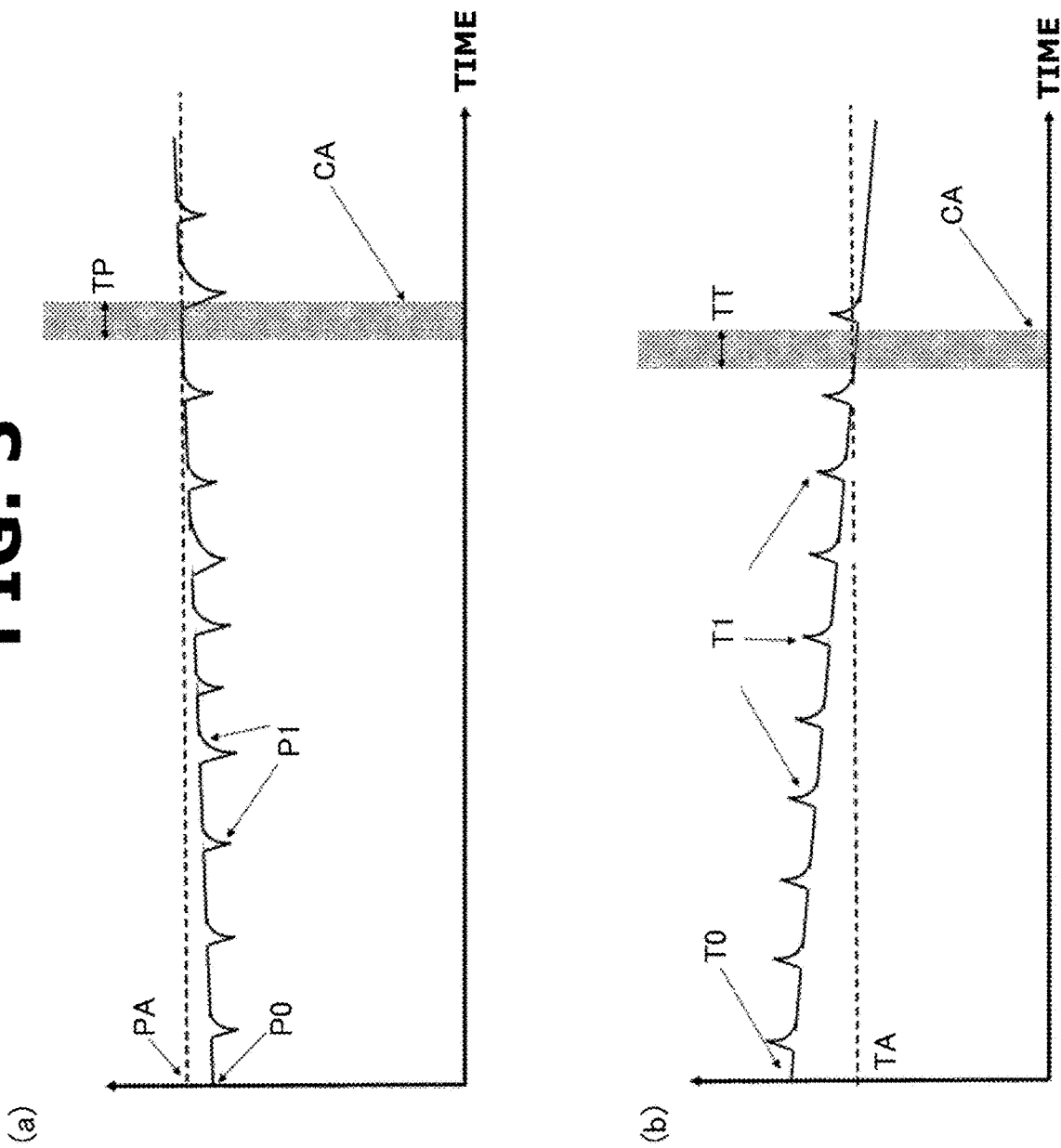
FIG. 3 shows (a) changes in pressure of an ozone vessel according to the first embodiment over time, illustrating a method for detecting a decrease in ozone concentration in a buffer tank when in a control mode for a constant temperature of the ozone vessel; and (b) changes in temperature of the ozone vessel over time, illustrating a method for detecting a decrease in ozone concentration in the buffer tank when in a control mode for a constant pressure of the ozone vessel.

<Constant Temperature Control Mode> The following describes a method for detecting a decrease in ozone concentration of the ozone vessel 20 when in the constant temperature control mode with reference to FIG. 2 and FIG. 3 (a).

FIG. 2 shows physical property curves each defining a relationship between temperature and pressure of the ozone storage section in an allowable operating region. In FIG. 2, a symbol P0 indicates a pressure at an initial stage of supply, and a symbol PA indicates a pressure at which a decrease in concentration is detected.

FIG. 3 (a) shows changes in pressure of the ozone vessel 20 over time, illustrating a method for detecting a decrease in the ozone concentration in the buffer tank 40 when in the constant temperature control mode of the ozone vessel 20. In FIG. 3 (a), a symbol P0 indicates an initial pressure (e.g., 6000 Pa), a symbol P1 indicates a minor pressure drop during extraction of ozone gas from the ALD chambers, a symbol PA indicates a concentration drop detection pressure (e.g., 6500 Pa), a symbol TP indicates an overpressure duration, and a symbol CA indicates a detection of ozone concentration drop.

The following describes an example of operation in which the temperature of the buffer tank 40 is controlled to be constant at about 128 K and the pressure of the buffer tank 40 is to be maintained at 6,000 Pa. When the supply valves V1 are opened so that the buffer tank 40 is integrated with the ozone storage section, the ozone gas in the buffer tank 40 decomposes into oxygen gas over time, and the sensed pressure value of the pressure gauge PG1 gradually increases under the control temperature of 128 K (FIG. 3 (a)). Although ozone gas is irregularly supplied from the buffer tank 40 to the ALD chambers 31, 32, 33, and 34, the configuration that the volumetric capacity of the buffer tank 40 is optimally set between 10 and 20 times a volume of ozone gas for a situation where ozone gas is supplied to all of the ALD chambers 31, 32, 33, and 34 simultaneously, serves to limit a momentary pressure drop to a maximum of 5 to 10% or less from a pressure before supply. Pressure pulsation (fluctuation) during supply operation of the ozone gas can be ignored by averaging over a certain period of time. Therefore, when a significant pressure increase (in the illustrated example, a pressure increase from 6,000 Pa to 6,600 Pa) is confirmed by monitoring for a certain period of time, it can be determined that the ozone concentration in the buffer tank 40 has decreased.

<Constant Pressure Control Mode> The following describes a method for detecting a decrease in ozone concentration in the constant pressure control mode of the ozone vessel 20 with reference to FIG. 2 and FIG. 3 (b).

FIG. 3 (b) shows changes in temperature of the ozone vessel 20 over time, illustrating a method for detecting a decrease in the ozone concentration in the buffer tank 40 when in the constant pressure control mode of the ozone vessel 20. A symbol T0 indicates an initial control temperature (e.g., 128 K), a symbol T1 indicates a minor control temperature change when ozone gas is extracted from the ALD chambers, a symbol TA indicates a concentration drop detection temperature (e.g., 126 K), a symbol TT indicates a control temperature decrease duration, and a symbol CA indicates a detection of ozone concentration drop.

The following describes an example of operation in which the pressure of the ozone vessel 20 is controlled to be constant at a value of 6,000 Pa and the initial temperature is about 128 K. In the buffer tank 40, the ozone gas decomposes over time. Then, the partial pressure of oxygen gas increases, and under the condition that the total pressure is constant, the control acts to lower the partial pressure of ozone gas so that a control target temperature for the ozone vessel 20 decreases.

The control section 35 stores the characteristic curves of FIG. 2 in advance, and is configured to detect an allowable lower limit of the control temperature. For example, as shown in FIG. 3 (b), when the pressure is controlled to 6,000 Pa, and the control temperature is shifted to a temperature lower than 126 K, it is possible to detect a decrease in the ozone concentration.

When such a decrease in concentration is detected, the control section 5 outputs an ozone supply disable signal to the control section 35 of the ozone gas utilization system 3, and immediately carries out the ozone gas replacement operation described above. Specifically, the exhaust valve V2 is opened, while the supply valves V1 and the ALD valves V are closed, so that the gas in the gas supply piping 41 and the buffer tank 40 is exhausted to the outside of the system. After evacuation to a certain pressure, the exhaust valve V2 is closed while the supply valves V1 and the ALD valves V are opened, so that high-concentration ozone gas is supplied from the ozone gas supply device 21, 22, or 23 of the ozone gas supply unit 2 to fill the buffer tank 40. When this filling is completed, a signal indicating gas standby completion is outputted to the control section 35 of the ozone gas utilization system 3.

Thereafter, the high-concentration ozone gas in the ozone vessel 20 is continuously charged into the buffer tank 40 via the supply valve V1 until a decrease in the ozone concentration is detected again by the method shown in FIG. 2 described above, and then supplied to the ALD chambers 31, 32, 33, and 34.

<Effects> As described above, by storing the physical property curves of pure ozone gas (100% concentration and 99.9% concentration) shown in FIG. 2 in the form of a table in the control section 35, it is possible to control supply of a desired high-concentration ozone gas. The control section 35 may be configured by setting an allowable pressure increase range (for example, 10%) with respect to the initial pressure.

As described above, the ozone gas supply system 1 according to the present embodiment can constantly detect the concentration of ozone gas in the buffer tank inexpensively using existing instrumentation such as a temperature sensor, without requiring an additional device such as an ozone concentration meter. This serves to enhance the utilization efficiency of the high-concentration ozone gas supplied to the ozone gas utilization system 3, and reduce the running cost and environmental load of the ozone utilization process.

Furthermore, by using the present concentrated type ozone vessel 20, buffer tank 40, and control method (software-based ozone concentration detection and switching operation), ozone gas having a constant concentration and a constant pressure can be supplied without waste, simultaneously to multiple ALD chambers that randomly and intermittently require high-concentration ozone gas. Namely, in contrast to conventional ozone devices in which ozone gas is wasted for a major part of time except when it is required by ALD devices, ozone gas can be effectively utilized, which greatly contributes to gas saving in the system and simplification of ozone abatement equipment.

[Second Embodiment] In the first embodiment, after the ozone concentration drops, even if it is a short time (e.g., within one minute) until the replacement of the ozone gas is completed, an event may occur where the ozone gas cannot be supplied during continuous ozone gas supply operation.

In view of the foregoing, in the second embodiment, two buffer tanks 40 are provided for constantly satisfying a continuous ozone supply requirement by the ALD chambers 31, 32, 33, and 34.

Figure 4:
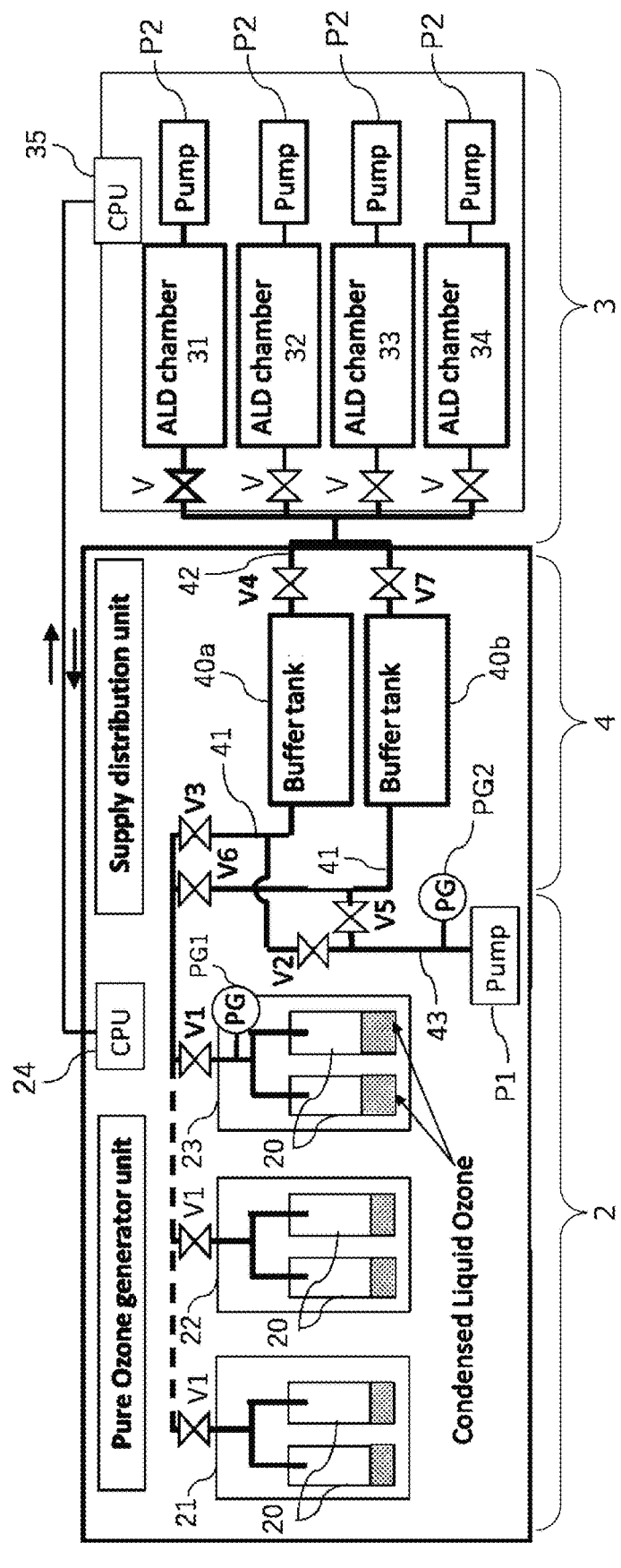
FIG. 4 is a schematic configuration diagram of an ozone gas supply system according to a second embodiment of the present invention.

The ozone gas supply system 1 according to the second embodiment shown in FIG. 4 includes buffer tanks 40a and 40b arranged in parallel. First switching valves V3 and V4 are disposed in the gas supply piping 41 on the upstream side of the first buffer tank 40a and in the gas supply piping 42 on the downstream side of the first buffer tank 40a, respectively. Second switching valves V6 and V7 are disposed in the gas supply piping 41 on the upstream side of the second buffer tank 40b and in the gas supply piping 42 on the downstream side of the second buffer tank 40b, respectively.

The gas supply piping 41 is connected to a gas exhaust piping 43. The gas exhaust piping 43 is provided with exhaust valves V2 and V5 and an exhaust pump P1. The exhaust valve V2 exhausts gas from the buffer tank 40a and the gas supply piping 41. The exhaust valve V5 exhausts gas from the buffer tank 40b and the gas supply piping 41. The exhaust pump P1 cooperates with the exhaust valves V2 and V5 to exhaust the gas to the outside of the system.

The following describes an example of operation of the second embodiment with reference to FIG. 5. In FIG. 5, a symbol S1 indicates a process start, a symbol S2 indicates detection of a decrease in ozone concentration in the buffer tank 40a, a symbol S3 indicates switching to supply via the buffer tank 40b, a symbol S4 indicates detection of a decrease in ozone concentration in the buffer tank 40b, and a symbol S5 indicates switching to supply via the buffer tank 40a.

As in the first embodiment, at the process start, the supply valve V1 and the first switching valves V3 and V4 are opened, and a space which is composed of the gas supply piping 41, the buffer tank 40a, the gas supply piping 42, and the ALD valves V is filled with ozone gas at a predetermined pressure. Simultaneously, the exhaust valves V2, V5 and the second switching valves V6, V7 are closed, wherein the buffer tank 40b is set in a vacuum state and on standby.

After a start of supply of the high-concentration ozone gas to the ALD chambers 31, 32, 33, and 34 of the ozone gas utilization system 3, in response to detection of a decrease in the ozone concentration in the space of the buffer tank 40a by the method according to the first embodiment, the second switching valve V6 is opened and the high-concentration ozone gas is supplied to the ozone gas utilization system 3 via the buffer tank 40a while filling of the buffer tank 40b is carried out. It typically takes 10 minutes or less to fill the buffer tank 40b at a desired pressure without affecting the supply through the buffer tank 40a. If the second switching valve V6 is implemented by a valve whose opening (CV value) can be adjusted stepwise, it is possible to fill the buffer tank 40b with high-concentration ozone gas while reducing the influence on the supply operation via the buffer tank 40a.

After the filling of the buffer tank 40b with high-concentration ozone is completed, the second switching valve V7 is opened and the first switching valves V3 and V4 are closed, thereby enabling complete switching to the supply of high-concentration ozone gas via the buffer tank 40b.

On the other hand, the gas in the buffer tank 40a and the gas supply piping 41 in which a decrease in the ozone concentration has been confirmed is exhausted to the outside of the system by the exhaust pump P1. Thereafter, the exhaust valve V2 is closed, the first switching valves V3 and V4 are held closed, and the buffer tank 40a is held in a vacuum state.

Thereafter, in response to detection of a decrease in the ozone concentration in the buffer tank 40b as shown in FIG. 2 while the high-concentration ozone gas is being supplied to the ozone gas utilization system 3 via the buffer tank 40b, the first switching valve V3 is opened so that the buffer tank 40a is filled with the high-concentration ozone gas while the high-concentration ozone gas is being supplied via the buffer tank 40b as shown in FIG. 5. It typically takes 10 minutes or less to fill the buffer tank 40a at a desired pressure without affecting the supply through buffer tank 40b. If the first switching valve V3 is implemented by a valve whose opening (CV value) can be adjusted stepwise, it is possible to reduce the influence on the supply operation via the buffer tank 40b.

In this way, when the filling of the buffer tank 40a with high-concentration ozone gas is completed, the first switching valve V4 is opened and the second switching valves V6 and V7 are closed, thereby enabling complete switching to supply via the buffer tank 40a.

By repeating the operations described above, it is possible to supply high-concentration ozone gas completely continuously for 24 hours without being unable to supply high-concentration ozone gas, from the viewpoint of the ozone gas utilization system 3 (ALD chambers 31, 32, 33, 34).

It is apparent that the ozone gas supply system 1 according to the present embodiment can produce the same advantageous effects as in the first embodiment. In particular, the provision of the plurality of buffer tanks 40 makes it possible to switch in suitable timing to supply ozone gas via one of the buffer tanks 40 in which high-concentration ozone gas is stored.

The invention claimed is:

1. An ozone gas supply system comprising:
   a buffer tank structured to temporarily store a high-concentration ozone gas having an ozone concentration of 80% or more by volume, and supply the high-concentration ozone gas to an ozone gas utilization system, wherein the high-concentration ozone gas is supplied to the buffer tank from an ozone vessel of an ozone gas supply unit; and
   a control section configured to detect a decrease in the ozone concentration in the buffer tank, based on a value of pressure of the ozone vessel at a predetermined temperature of the ozone vessel, with reference to a relationship between temperature and pressure of an ozone gas having an ozone concentration of 100% by volume and a relationship between temperature and pressure of an ozone gas having an ozone concentration of less than 100% by volume, wherein the ozone vessel is communicating with the buffer tank;
   wherein, in response to detection of a decrease in the ozone concentration in the buffer tank, gas within the buffer tank and gas supply piping is exhausted out of the ozone gas supply system, and after the exhausting, the high-concentration ozone gas is supplied from the ozone vessel to the buffer tank, wherein the gas supply piping connects the buffer tank and the ozone vessel.

2. The ozone gas supply system as claimed in claim 1, further comprising:
   a supply valve structured to supply the high-concentration ozone gas from the ozone vessel to the buffer tank; and
   an exhaust valve structured to exhaust the gas within the buffer tank and the gas supply piping out of the ozone gas supply system;
   wherein the control section is configured to control operation of the supply valve and the exhaust valve based on an estimated value of the ozone concentration in the buffer tank, wherein the estimated value is calculated based on the value of pressure of the ozone vessel at the predetermined temperature of the ozone vessel.

3. The ozone gas supply system as claimed in claim 2, wherein the control section is configured to close the supply valve and open the exhaust valve, in response to detection of a decrease in the ozone concentration in the buffer tank.

4. The ozone gas supply system as claimed in claim 3, wherein the control section is configured to output a signal to the ozone gas utilization system, in response to detection of a decrease in the ozone concentration in the buffer tank, wherein the signal is indicative of disabling ozone supply.

5. The ozone gas supply system as claimed in claim 1, comprising two of the buffer tanks arranged in parallel, wherein, in response to detection of a decrease in the ozone concentration in a first one of the buffer tanks while the high-concentration ozone gas is supplied via the first buffer tank, supply of the high-concentration ozone gas is switched to supply via a second one of the buffer tanks.

6. The ozone gas supply system as claimed in claim 5, further comprising:
- a supply valve structured to supply the high-concentration ozone gas from the ozone vessel to the first buffer tank or the second buffer tank;
- a first exhaust valve structured to exhaust the gas within the first buffer tank out of the ozone gas supply system;
- a first switching valve set structured to supply the high-concentration ozone gas to the ozone gas utilization system via the first buffer tank;
- a second exhaust valve structured to exhaust the gas within the second buffer tank out of the ozone gas supply system; and
- a second switching valve set structured to supply the high-concentration ozone gas to the ozone gas utilization system via the second buffer tank;
- wherein the control section is configured to control operation of the supply valve, the first exhaust valve, the first switching valve set, the second exhaust valve, and the second switching valve set, based on an estimated value of the ozone concentration in the first buffer tank and an estimated value of the ozone concentration in the second buffer tank, wherein the estimated values are calculated based on the value of pressure of the ozone vessel at the predetermined temperature of the ozone vessel.

7. The ozone gas supply system as claimed in claim 6, wherein the control section is configured to, in response to detection of a decrease in the ozone concentration in the first buffer tank, supply the high-concentration ozone gas to the second buffer tank by closing a second switching valve of the second switching valve set downstream of the second buffer tank, and opening a second switching valve of the second switching valve set upstream of the second buffer tank.

8. The ozone gas supply system as claimed in claim 7, wherein the control section is configured to, in response to completion of filling of the second buffer tank with the high-concentration ozone gas, open the second switching valve of the second switching valve set downstream of the second buffer tank, close a first switching valve of the first switching valve set upstream of the first buffer tank, close a first switching valve of the first switching valve set downstream of the first buffer tank, and open the first exhaust valve.

9. The ozone gas supply system as claimed in claim 8, wherein each of the first switching valve of the first switching valve set upstream of the first buffer tank and the second switching valve of the second switching valve set upstream of the second buffer tank is structured to be opened to have an opening that is adjustable stepwise.

10. The ozone gas supply system as claimed in claim 8, further comprising an exhaust pump structured to cooperate with the first exhaust valve and the second exhaust valve to exhaust the gas within the first buffer tank and the second buffer tank out of the ozone gas supply system, wherein the control section is configured to control operation of the first exhaust valve and the second exhaust valve based on pressure of the exhaust pump.

11. The ozone gas supply system as claimed in claim 7, wherein each of the first switching valve of the first switching valve set upstream of the first buffer tank and the second switching valve of the second switching valve set upstream of the second buffer tank is structured to be opened to have an opening that is adjustable stepwise.

12. The ozone gas supply system as claimed in claim 7, further comprising an exhaust pump structured to cooperate with the first exhaust valve and the second exhaust valve to exhaust the gas within the first buffer tank and the second buffer tank out of the ozone gas supply system, wherein the control section is configured to control operation of the first exhaust valve and the second exhaust valve based on pressure of the exhaust pump.

* * * * *